United States Patent [19]

King

[11] Patent Number: 5,579,703

[45] Date of Patent: Dec. 3, 1996

[54] SUPPORT STAND FOR BIRD CAGES, FISH TANKS AND THE LIKE

[76] Inventor: Richard King, 105 West La., Sayville, N.Y. 11782

[21] Appl. No.: 304,114

[22] Filed: Sep. 12, 1994

[51] Int. Cl.$^6$ .................................................. A47B 96/14
[52] U.S. Cl. ........................ 108/186; 108/153; 211/189
[58] Field of Search ................................. 108/186, 180, 108/155, 159, 153; 211/189, 192

[56] References Cited

U.S. PATENT DOCUMENTS

| | | | |
|---|---|---|---|
| 2,811,401 | 10/1957 | Chaney | 108/148 |
| 2,875,904 | 3/1959 | Gingher et al. | 108/186 |
| 3,411,634 | 11/1968 | Pesce | 211/189 X |
| 3,533,513 | 10/1970 | Berman | 211/189 |
| 3,709,166 | 1/1973 | Bush | 108/148 X |
| 4,991,325 | 2/1991 | Teduschi | 108/116 X |
| 5,016,765 | 5/1991 | Leonardo | 211/189 |

FOREIGN PATENT DOCUMENTS

| | | | |
|---|---|---|---|
| 1312598 | 11/1962 | France | 108/153 |
| 688363 | 3/1965 | Italy | 108/153 |
| 1076243 | 7/1967 | United Kingdom | 108/153 |

*Primary Examiner*—Peter M. Cuomo
*Assistant Examiner*—Janet M. Wilkens
*Attorney, Agent, or Firm*—Galgano & Burke

[57] ABSTRACT

A readily assembled and disassembled support stand for bird cages, fish tanks and the like which is easy to package, transport and store. The stand includes horizontally-disposed rectangular tubular top and bottom support frames having tubular stanchions at each corner thereof which telescopically receive four vertically-disposed tubular side support members, each of which interconnects one of the top frame stanchions with the bottom frame stanchion disposed therebelow and in vertical alignment therewith. The support stand has a releasable locking mechanism which provides for ready assembly and disassembly and, also, sturdily secures each side member to their respective stanchion when assembled.

3 Claims, 3 Drawing Sheets

SUPPORT STAND FOR BIRD CAGES, FISH TANKS AND THE LIKE

BACKGROUND OF THE INVENTION

1. Field of the Invention

The present invention relates to a stand for supporting bird cages, fish tanks and the like. More particularly, the present invention relates to a readily assembled and disassembled support stand for supporting bird cages, fish tanks and the like which can be easily boxed, stored and/or transported in disassembled dimensionally advantageous form.

2. Description of the Prior Art

While support stands, in general, are common, so far as is known, there is no presently available support stand for relatively heavy bird cages, like the kind used for large birds such as parrots and macaws, and fish tanks which is readily assembled and disassembled for easy transport and storage. It has been the accepted practice in the pet industry that stands of this sort, typically made of wrought iron, must be manufactured, pre-assembled and welded together prior to their transport and storage to assure that the stand is strong enough to support these large and heavy bird cages or tanks. This, however, makes it difficult and uneconomical to package, transport and/or store large quantities of the stands because of their impractical size.

Other support stands, although transported and stored in disassembled form, are usually assembled with screws, nuts and bolts, or the like making it difficult to easily assemble and disassemble the stand in a relatively short period of time, or, disassemble the stand without damage. Still other support stands may be easily and quickly assembled but may not be easily disassembled. Yet, still other stands may be readily assembled and disassembled but lack the sturdiness of the present invention because they lack or have insufficient locking means between their respective members thus making the stand unsteady.

While the prior art is apparently generally acceptable for its intended use, so far as is known, there is no known prior art which affords a support stand for relatively heavy bird cages, fish tanks and the like which can be readily assembled and disassembled for easy packaging, transport and/or storage. Further, so far as is known, there is no presently available support stand for bird cages, fish tanks, and the like which employs means for releasably locking the top and bottom support frames to the stanchion side support members for easy assembly and disassembly.

SUMMARY OF THE INVENTION

Accordingly, it is an object of the present invention to provide a novel readily assembled and disassembled support stand for relatively heavy bird cages, fish tanks and the like which is easy to package, transport and store in an efficient and economically affordable manner.

It is another object of the present invention to provide a support stand which is economical to manufacture, durable and relatively of simple construction and design.

Another object of the invention is to provide a support stand which can be safely, sturdily and securely assembled.

Still another object of the present invention is to provide a support stand which is readily assembled and disassembled by employing a releasable locking mechanism for fastening and detaching adjoining members.

Certain of the foregoing and related objects are attained in accordance with the present invention by the provision of a support stand which is easy to package, transport and store, which includes a generally horizontally disposed rectangular tubular top support frame having a downwardly depending tubular stanchion at each corner thereof. The support stand further includes a generally horizontally disposed rectangular tubular bottom support frame, having an upwardly extending tubular stanchion at each corner thereof, the bottom support frame being spaced below the top support frame in vertical alignment therewith. Further, the support stand includes four vertically-disposed tubular side support members, each of which interconnects one of the top frame stanchions with the bottom frame stanchion disposed therebelow in alignment therewith. Means are also provided for releasably locking the top and bottom support frames to the stanchion side support members.

Preferably, the stanchions and side support members each have holes formed therethrough and are dimensioned such that one is telescopically received in the other with their respective holes being axially aligned, when assembled. Desirably, the means for releasably locking the stanchions to the side support members comprises a spring loaded latch means. Most desirably, the means for releasably locking consists of a J-shaped leaf spring located within each telescopically received member having a detent attached thereto receivable and engageable within the axially aligned openings in a snap-fit manner, thereby releasably locking each respective telescopic inner member within each telescopic outer member.

In a preferred embodiment, the bottom support frame further comprises a bottom support leg attached to and extending downwardly from each corner of the bottom support frame. Preferably, a support leveling cushion is advantageously fastened to each bottom support legs. The bottom support frame also preferably includes a support shelf attached thereto for supporting accessories. The support shelf is preferably made of a lightweight gridded material. Most desirably, at least one horizontal side support member is attached to and located between the side support members for additional stability. Most advantageously, the support stand is constructed from metal or wrought iron and or a combination thereof.

DETAILED DESCRIPTION OF THE PREFERRED EMBODIMENT

Figure 1:
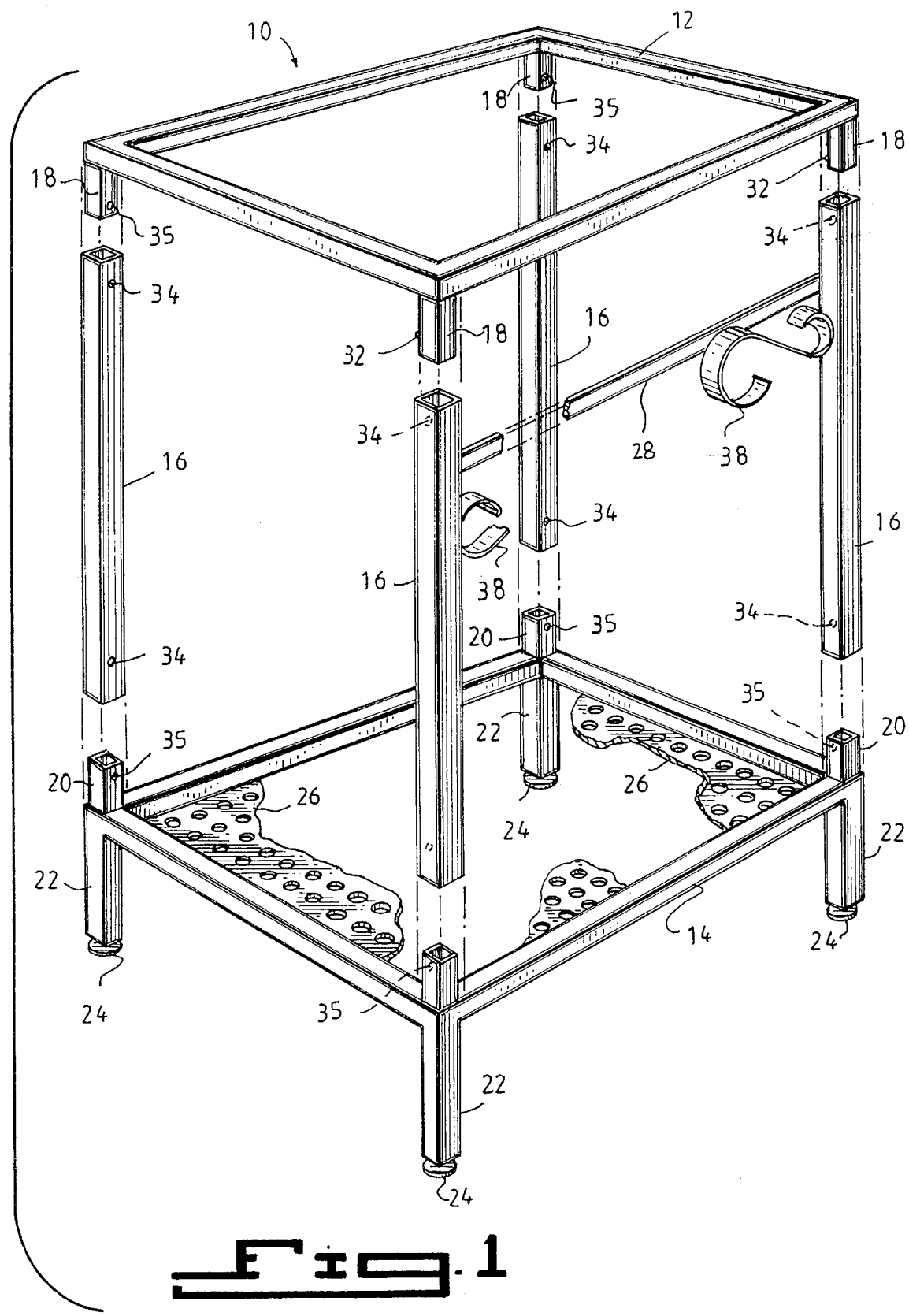
FIG. 1 is an exploded top and side perspective view with portions broken away, of the readily assembled and disassembled support stand for bird cages, fish tanks and the like embodying the present invention.

Turning now in detail to the appended drawings, and in particular FIG. 1, therein illustrated is a novel readily assembled and disassembled support stand for bird cages, fish tanks and the like, generally designated by reference numeral 10, comprised of generally horizontally disposed top and bottom frames 12 and 14, and four vertically-disposed tubular side support members 16. Preferably, the top frame 12 and the bottom frame 14 are rectangular in shape and have a square shaped cross-sectional profile. Frames 12 and 14 also have tubular stanchions 18, and 20 located at each corner thereof which are, preferably, telescopically received within each respective side member 16. A horizontal side support member 28 is optionally attached to and located between the side support members 16 which provides additional stability for the support stand 10. A decorative scroll member 38 can be mounted to the horizontal side support member 28 for aesthetic purposes.

Figure 2:
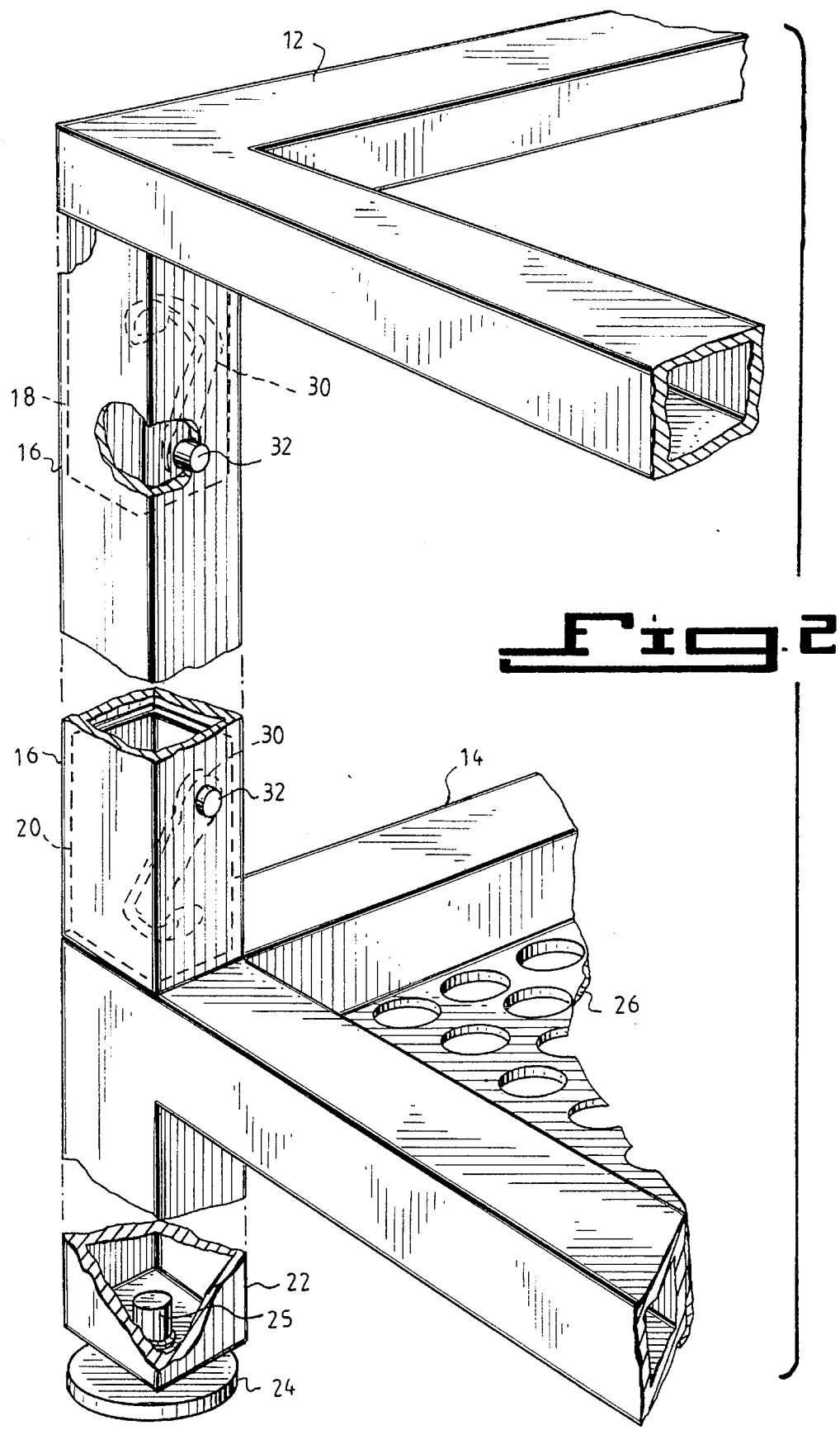
FIG. 2 is an enlarged fragmentarily-illustrated perspective view, with-portions broken away, of the support stand showing the telescopic assembly thereof, with releasable locking mechanisms shown partly in phantom view.
Figure 4:
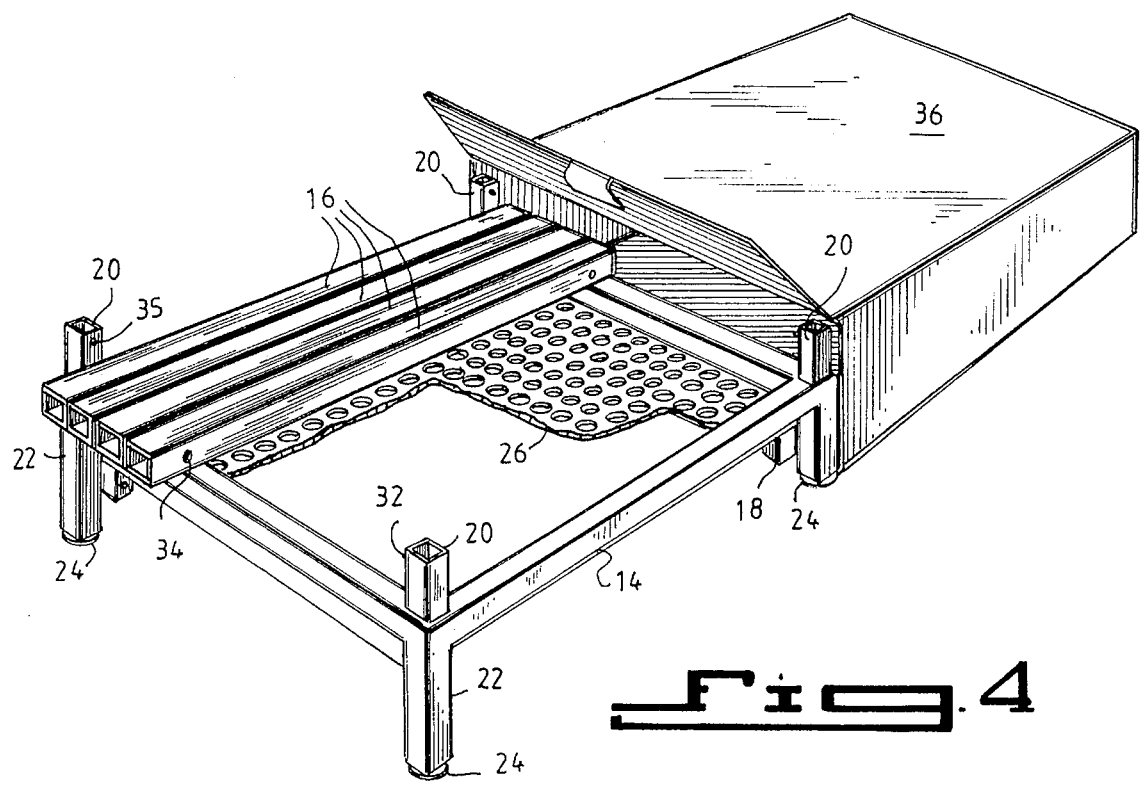
FIG. 4 is a top and side perspective view of support stand in disassembled form ready for packaging in a carton.

As seen in FIGS. 1, 2 and 4 the bottom support frame 14 has support legs 22 located, at each corner thereof which are attached to and extend downwardly from the bottom support frame 20. Preferably, each support leg 22 has a leveling cushion 24 attached thereto which allows leveling of the support stand 10 while at the same time provides a soft contact area for each support leg 22 as it contacts the floor. Usually, the leveling cushions 24 are threadably affixed to the bottom of each support leg 22 (via a threaded shank 25 as seen in FIG. 2.)

Also as seen FIGS. 1, 2 and 4, the support stand 10 preferably includes a horizontally disposed support shelf 26 mounted on the bottom support frame 14. Preferably, the support shelf 26 is constructed from a lightweight gridded material.

Figure 3:
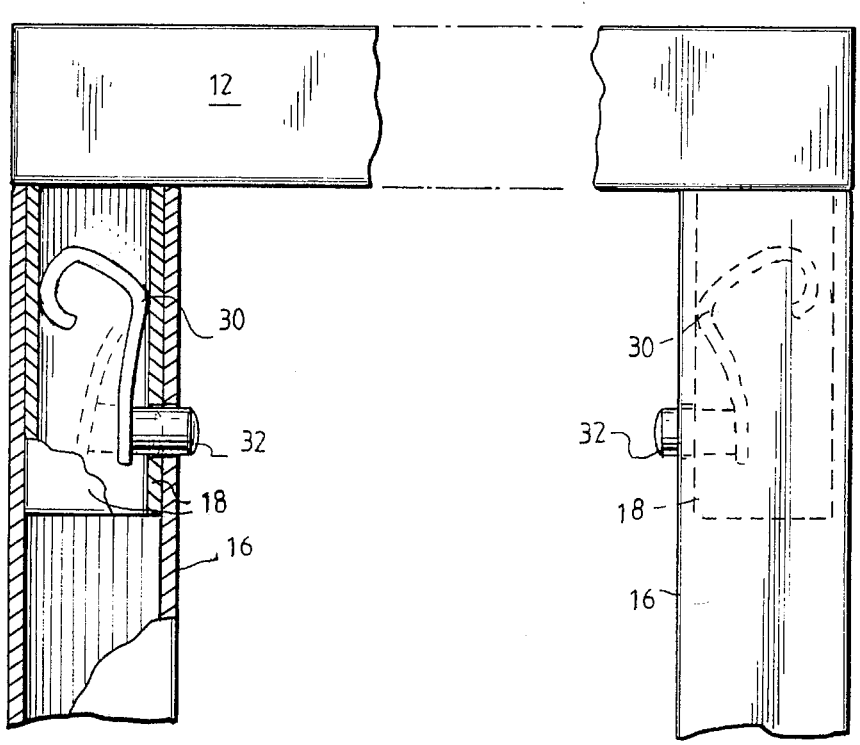
FIG. 3 is an enlarged, fragmentarily-illustrated elevational view, in part section, of the support stand showing a leaf spring with a detent used to lock the stanchions and side members together.

FIGS. 2 and 3 best illustrate the telescopic assembly of the support stand 10. More particularly, the side members 16 telescopically receive both the top frame stanchion 18 and the bottom frame stanchion at each respective corner, thereby connecting the top and bottom frames 12, 14 of the support stand 10. For example, a releasable locking mechanism in the form of a leaf spring 30, is generally positioned within the top and bottom frame stanchions 18, 20 to releasably lock the top and bottom frame stanchions 18, 20 to the vertical side members in a snap-fit manner.

As more clearly illustrated in FIG. 3, a generally J-shaped leaf spring 30, is located within the stanchions 18, 20, and is positioned under tension between the inside wall of the stanchions 18, 20, to provide a biasing action. A detent 32 is mounted upon one end of the spring 30 and the same are positioned such that when the stanchions 18, 20 and side member 16 are positioned in their fully assembled state, the detent 32 protrudes through a pair of axially aligned apertures 34, 35 of each respective stanchion 18, 20 and side member 16, thereby releasably locking the two stanchions 18, 20 to the side member in a snap-fit manner. As can be appreciated, to effect easy disassembly of the support stand 10, the protruding detent 32 is pushed inwardly through the axially aligned holes 34, 35 releasing the stanchion 18, 20 from the side member 16 thereby allowing the two connected member to be easily pulled apart.

FIG. 4 shows the support stand 10 in disassembled form and ready for packaging, transport and/or storage. Preferably, the packaging container 36 is dimensioned slightly larger than the bottom support frame 14 to make for economically efficient packaging of the support stand 10.

Various modifications may be made as will be apparent to those skilled in the art. For example, while the stanchions 18, 20 are preferably telescopically received within the side support members 16, an alternative embodiment would have the telescopic members reversed. Advantageously, the top support frame 12 could be dimensioned to fit within the bottom support frame 14, or vice versa, for efficient packaging. In another embodiment, the side members 16 could be dimensioned no longer than the width of the bottom support frame 14 which would also make for efficient and economic packaging. Still another embodiment could have a top support shelf inwardly disposed to the top support frame. Another alternative embodiment could employ the use of different type of spring as a releasable locking mechanism. While the support stand 10 is preferably made of steel or wrought iron, other materials of sufficient strength to support relatively heavy and large bird cages and fish tanks could also be used.

Accordingly, while only one embodiment of the present invention has been illustrated in the appended drawings, it is to be understood that various modifications may be made as will be apparent to those skilled in the art.

What is claimed is:

1. A readily assembled and disassembled metal support stand for supporting relatively heavy bird cages and fish tanks in which the stand is easy to package, transport and store, the stand comprising:

a generally horizontal disposed rectangular tubular top support frame defining a generally rectangular opening and a surrounding planar upper surface for supporting along at least a portion of said upper surface a relatively heavy bird cage or fish tank and having a lower surface having a downwardly depending tubular stanchion at each corner thereof;

a generally horizontal disposed rectangular tubular bottom support frame, having an upwardly extending tubular stanchion at each corner thereof, said bottom support frame being spaced below said top support frame in vertical alignment therewith;

four vertically-disposed tubular side support members, each of which interconnects one of the top frame stanchions with the bottom frame stanchion disposed therebelow in alignment therewith;

said stanchions and side support members each having holes formed therethrough and being dimensioned such that one is telescopically received in the other, thereby defining a telescopic inner member being received within a telescopic outer member with their respective holes being axially aligned, when assembled;

means for releasably locking said stanchions of top and bottom support frames to said side support members comprising a leaf spring having a detent attached to one end thereof Which is receivable and engageable within the axially aligned holes in a snap-fit manner, thereby releasably locking each respective telescopic inner member to each telescopic outer member with said holes and said detent disposed and configured so that when said detent is engaged within the axially aligned holes each of said vertical support member abuts one of said top frame and said bottom frame;

four bottom support legs, each of which is attached to and extends downwardly from a corner of said bottom support frame in alignment with said stanchions and vertical side support members;

at least one horizontal side support member having an elongated and slender profile and being attached to and located between said side support members for additional stability; and a lightweight gridded support shelf mounted to said bottom support frame for supporting accessories.

2. The support stand of claim 1, further comprising a plurality of support leveling cushions fastened to said bottom support legs.

3. The support stand of claim 1, wherein said support stand is made of wrought iron.

\* \* \* \* \*